(12) United States Patent
Yamada et al.

(10) Patent No.: US 8,755,961 B2
(45) Date of Patent: Jun. 17, 2014

(54) HYBRID VEHICLE BATTERY CHARGE MANAGEMENT APPARATUS

(75) Inventors: Kazunao Yamada, Toyota (JP); Yusuke Mizuno, Kariya (JP); Yasushi Sakuma, Chita-gun (JP); Yasuyuki Itoh, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 133 days.

(21) Appl. No.: 13/245,958

(22) Filed: Sep. 27, 2011

(65) Prior Publication Data

US 2012/0078458 A1    Mar. 29, 2012

(30) Foreign Application Priority Data

Sep. 29, 2010    (JP) .................................. 2010-219344

(51) Int. Cl.
*B60W 20/00*    (2006.01)
*B60W 30/18*    (2012.01)
*B60L 11/18*    (2006.01)

(52) U.S. Cl.
CPC ......... *B60W 20/1062* (2013.01); *B60W 20/106* (2013.01); *B60W 30/18127* (2013.01); *B60W 2510/244* (2013.01); *B60L 11/1861* (2013.01); *B60L 11/1862* (2013.01); *Y02T 10/6291* (2013.01); *Y02T 10/7044* (2013.01); *Y02T 1/7283* (2013.01); *Y10S 903/907* (2013.01)
USPC ......................................... 701/22; 903/907

(58) Field of Classification Search
CPC ........ B60K 6/46; B60W 10/06; B60W 10/26; B60W 20/00; B60W 2510/244; Y02T 10/6217; Y02T 10/7258
USPC .......................... 701/22; 180/65.29; 903/903
See application file for complete search history.

(56) References Cited

U.S. PATENT DOCUMENTS

| 6,314,347 | B1 | 11/2001 | Kuroda et al. | |
| 8,374,740 | B2 * | 2/2013 | Druenert et al. | 701/22 |
| 2010/0152937 | A1 | 6/2010 | Yamada et al. | |

FOREIGN PATENT DOCUMENTS

| JP | A-2001-183150 | 7/2001 |
| JP | A-2007-50888 | 3/2007 |

* cited by examiner

*Primary Examiner* — John R Olszewski
*Assistant Examiner* — Todd Melton
(74) *Attorney, Agent, or Firm* — Posz Law Group, PLC (57) ABSTRACT

A drive condition, which is used to determine a SOC management plan, is collected from each of road sections and is cumulatively memorized in a durable memory medium. When a remaining charge amount of a battery reaches a lower limit standard value or an upper limit standard value at a certain location, a candidate control section is defined around and includes such point. The candidate control section is defined to extend a predetermined distance forward and backward from such point. The drive conditions stored for the candidate control section are used to determine the SOC management plan that controls the remaining charge amount of the battery to be controlled within a standard range. When the vehicle enters the candidate control section, the drive control of a power source in the vehicle is performed according to the SOC management plan for the candidate control section.

7 Claims, 5 Drawing Sheets

(COLLECTION DATA)

| TIME | 00 | 01 | 02 | 03 | 04 | 05 | 06 | 07 | 08 | 09 | 10 |
|---|---|---|---|---|---|---|---|---|---|---|---|
| ROAD ID | 01 | 01 | 01 | 01 | 01 | 01 | 02 | 02 | 02 | 03 | 03 |
| VEHICLE SPD [km/h] | 00 | 04 | 08 | 12 | 16 | 20 | 30 | 40 | 40 | 40 | 40 |
| SOC [%] | 60 | 60 | 60 | 60 | 59 | 59 | 59 | 59 | 58 | 58 | 58 |

HYBRID VEHICLE BATTERY CHARGE MANAGEMENT APPARATUS

CROSS REFERENCE TO RELATED APPLICATION

The present application is based on and claims the benefit of priority of Japanese Patent Application No. 2010-219344, filed on Sep. 29, 2010, the disclosure of which is incorporated herein by reference.

TECHNICAL FIELD

The present invention generally relates to a vehicle drive control apparatus performing drive control of a power source used for a travel of a vehicle, which uses an internal combustion engine and a motor as its power source.

BACKGROUND

A conventional vehicle drive control apparatus used in a hybrid vehicle, is disclosed in Japanese Patent Laid-Open No. 2000-333305 (JP '305), also U.S. Pat. No. 6,314,347. The apparatus of JP '305 is used for planning a charge-discharge schedule that uses a motor for travel in a low drive-efficiency area, such as frequently-congested roads where use of an internal-combustion engine would be inefficient. Also, the apparatus charges electricity to a battery during a travel of the vehicle in a section where the vehicle is powered by the internal-combustion engine, in a manner that supplements the amount of electricity consumed by the travel of the vehicle in the low drive-efficiency section. The apparatus is used for performing drive control of the engine and the motor according to such charge-discharge schedule for travel of the vehicle on a route between a start point and a destination.

The apparatus of JP '305 requires a user of the vehicle to enter an instruction of destination setting and/or route search, in order to determine a route toward the destination. Thereby making the user feel bothered and/or inconvenienced.

In addition, though the apparatus of JP '305 is configured to have a charge-discharge schedule planned for an entire route between the start point and the destination, an actual travel of the vehicle may not necessarily allow drive control according to such schedule, due to a level of driver's proficiency and/or a traffic flow surrounding the vehicle. When such an un-planned drive control that diverts from the planned schedule is frequently performed, energy consumption may be increased inadvertently in comparison to the travel according to the planned schedule.

SUMMARY

In an aspect of the present disclosure, a vehicle drive control apparatus disposed in a vehicle that uses an internal-combustion engine and a motor as a driving power source, the apparatus comprising: a drive condition accumulation unit that collects a drive conditions when the vehicle travels in each of predetermined sections and cumulatively stores the drive conditions in a memory unit; a charge control section determination unit that determines a candidate control section at a reference point, at which the candidate control section is designated from a first section being an already-traveled section of a predetermined distance including and before the reference point, and a second section being a to-be traveled section of a predetermined distance including and after the reference point, wherein during a travel of the vehicle the location of when a remaining charge amount of a battery exceeds a predetermined upper limit standard value or falls below a predetermined lower limit standard value is designated as the reference point; and a schedule plan unit that determines a state of charge (SOC) management plan for the candidate control section by using the drive conditions stored in the memory unit. The SOC management plan controls the remaining charge amount of the battery to stay within a standard range when the vehicle travels. When the vehicle is determined to enter the candidate control section, the drive control of the power source is performed according to the SOC management plan created for the candidate control section into which the vehicle has entered.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
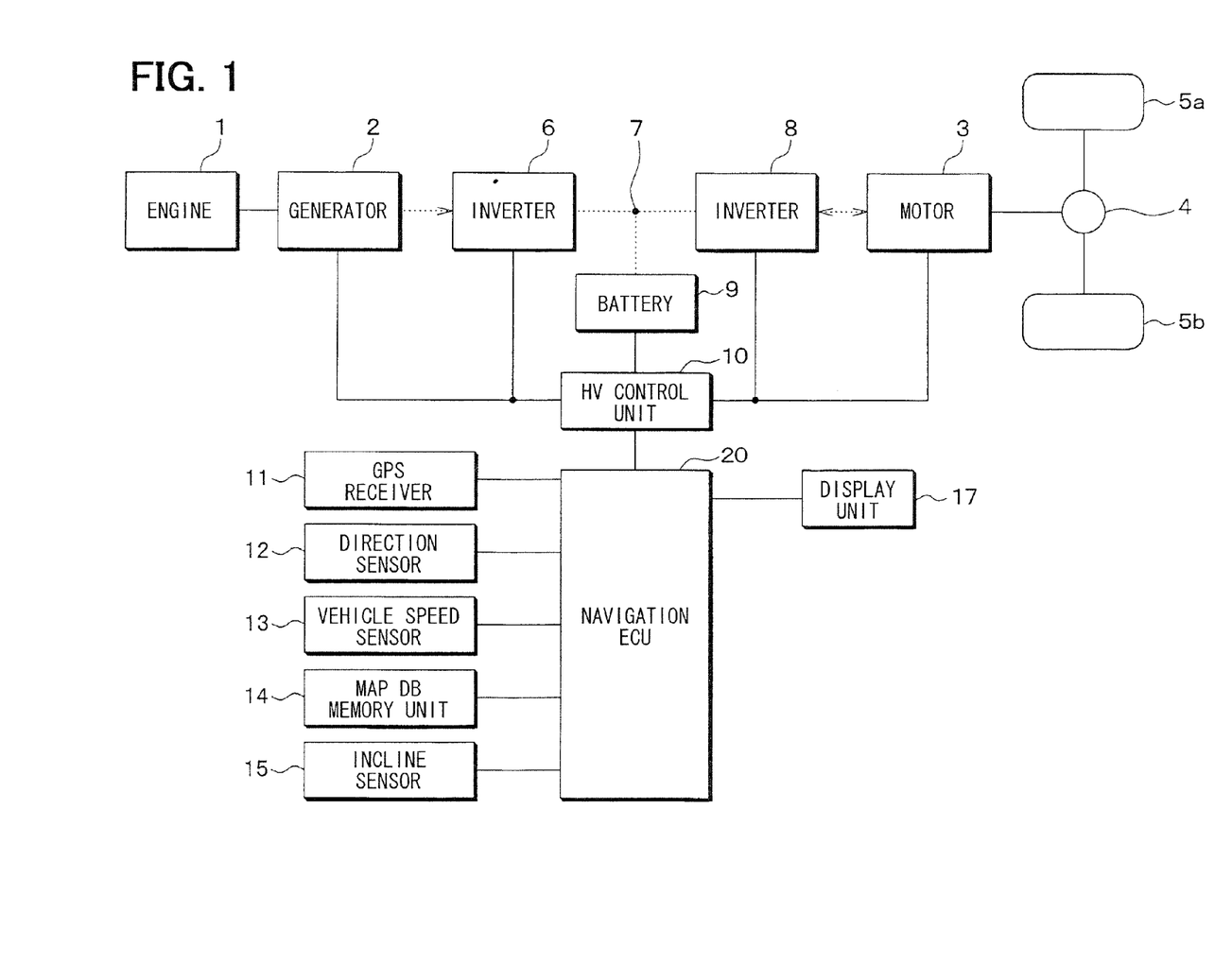
FIG. 1 is a schematic of a vehicle drive control apparatus of a hybrid vehicle in an embodiment of the present disclosure.

The present disclosure will now be described more fully with reference to the accompanying drawings. With reference now to FIG. 1, a vehicle drive control apparatus of a hybrid vehicle is shown. The vehicle drive control apparatus of the vehicle includes an internal combustion engine 1, a generator 2, a motor 3, a differential gear 4, a plurality of tires 5a, 5b, an inverter 6, a DC link 7, an inverter 8, a battery 9, an hybrid (HV) control unit 10, a GPS receiver 11, a direction sensor 12, a vehicle speed sensor 13, a map DB memory unit 14, an incline sensor 15, a display unit 17, and a navigation ECU 20. The vehicle drive control apparatus control the drive of the vehicle by controlling the use of the engine 1 and the motor 3.

The engine 1 and the motor 3 provide the necessary power to drive or run the vehicle, and switches between multiple running modes according to an accelerator operation. When the engine 1 is used as the power source, a rotational force of the engine 1 is transmitted to the tires 5a, 5b through a clutch mechanism, which is not shown, and the differential gear 4. When the motor 3 is used as the power source, a direct current electric power from the battery 9 is converted to an alternating current electric power by the DC link 7 and the inverter 8. The alternating current electric power operates the motor 3, and the motor 3 generates a rotational force that is transmitted to the differential gear 4 and to the tires 5a, 5b. In the following, a running mode only using the engine 1 as the power source is designated as an engine running mode, and a running mode only using the motor 3 as the power source is designated as a motor running mode, and a running mode using both of the engine 1 and the motor 3 as the power source is designated as a hybrid running mode. In the following, the hybrid running mode and the engine running mode may both be designated as the hybrid running mode.

The rotational force generated by the engine 1 may also be transmitted to the generator 2. The generator 2 converts the rotational force into an electric power that is supplied to the inverter 6. The inverter 6 converts the electric power to a direct current electric power. The DC link 7 supplies the direct current electric power to the battery 9, which charges the battery 9. Such charging of the battery 9 is being performed by the engine 1 in which fuel is consumed, and may be referred to as an internal combustion charge.

The battery 9 may also be charged by the motor 3. Specifically, when the hybrid vehicle slows down or decelerates by way of a braking mechanism, which is not shown, the resistance created during the deceleration is transferred to the motor 3 as a rotational force. The motor 3 converts the rotational force to an electric power that is then converted to a direct current electric power by the inverter 8. The DC link 7 supplies the direct current electric power to the battery 9, which charges the battery 9. Such charging of the battery 9 may be referred to as a re-generation charge.

When the remaining battery charge amount decreases to a lower limit standard value during a stop of the vehicle, non-efficient compulsory charging may be started by the HV control unit 10. Additionally, when the remaining battery amount increases to an upper limit standard value during a travel of the vehicle in a section that allows re-generation charging, the HV control unit 10 may prohibit the re-generation charging to protect the battery 9, at a loss of otherwise regenerated electric power. Both of these situations are not desirable.

The HV control unit 10 controls the operation of the generator 2, the motor 3, the inverter 6, the inverter 8, and the battery 9. The HV control unit 10 may be realized as a microcomputer, or it may be realized as a hardware having designated circuit configuration for functionality.

The HV control unit 10 switches the running mode of the vehicle based on a state of charge (SOC) of the battery 9. The SOC represents the remaining amount of charge in a battery. Therefore, the greater the value of the SOC the greater the amount of charge left in the battery. A current SOC represents the currently measured SOC of the battery 9. The HV control unit 10 updates the current SOC by detecting the state of the battery 9 at regular intervals. A standard SOC represents a threshold value or a target control value that is used to determine whether to perform an electric power generation or a running assist at the HV control unit 10. For example, the standard SOC may be set at 60%. The target control value can be changed by way of the navigation ECU 20.

The HV control unit 10 uses the current SOC and the standard SOC in switching between the multiple running modes (i.e., the motor running mode and the hybrid running mode) that utilize different power sources to drive or run the vehicle. Based on a degree of accelerator opening, a battery charge amount of the battery 9, temperature of the battery 9, and the like, the HV control unit 10 repeatedly switches between the multiple running modes. Furthermore, based on the target control value provided from the navigation ECU 20, the value of the standard SOC is updated in order to control the generator 2, the motor 3, the inverter 6, the inverter 8 together with other components, to bring the charge amount of the battery 9 closer to the standard SOC. The target control value and the standard SOC may also be referred to as the target SOC.

The HV control unit 10 switches the running modes of the vehicle based on the target SOC input from the navigation ECU 20, and switches operation and non-operation of the internal combustion charge and the re-generation charge. The HV control unit 10 determines the running method and controls the actuators based on the running method, so that the current SOC is maintained to have a value that is equal to or close to the target SOC.

In addition, when the target SOC is not provided by the navigation ECU 20, the HV control unit 10 automatically performs the drive control according to the vehicle speed, the accelerator opening degree, or the like.

With continuing reference to FIG. 1, the vehicle drive control apparatus determines a vehicle position, a running direction, and a running speed with the use of the GPS receiver 11, the direction sensor 12 and the vehicle speed sensor 13.

The map DB memory unit 14 is a memory medium to memorize map data. The map data comprises of a node data that corresponds to each of plurality of intersections, and a link data that corresponds to each of road sections (i.e., a link) respectively connecting two intersections. One piece of node data includes a node ID number of the node concerned, position information, and type information. In addition, one piece of link data includes a link ID number (i.e., a link ID hereinafter) of the link concerned, position information, and type information. The position information includes position data of an interpolation point and segment data that connects two adjacent points (i.e., either of the two end nodes or interpolation points). Data of each segment has a segment ID, a segment incline, a segment direction, and a segment length.

The incline sensor 15 has a gyro sensor for detecting directional change in a pitch direction, a yaw direction, and a roll direction of the vehicle. Based on the detected change in the pitch direction from the gyro sensor, the inclination of the road can be calculated.

The display unit 17 has a liquid crystal display screen or the like to displays an image on the screen based on a video signal input from the navigation ECU 20.

Figure 2:
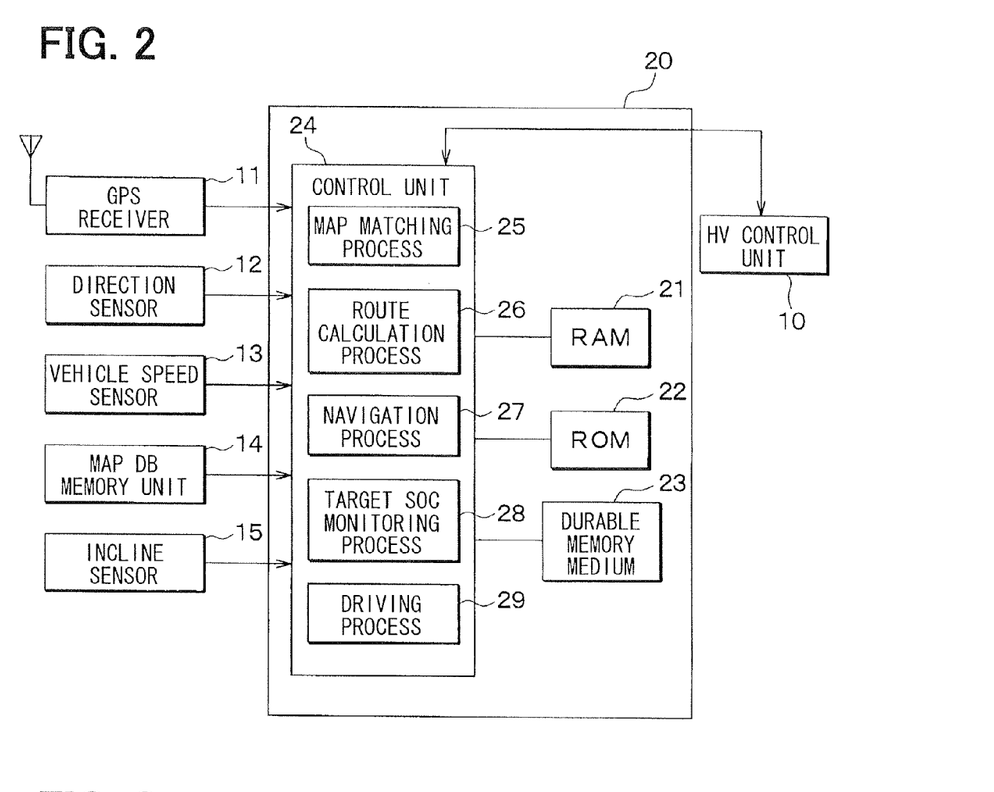
FIG. 2 is a schematic of a navigation ECU of the vehicle drive control apparatus of FIG. 1.

With reference now including FIG. 2, the navigation ECU 20 has a control unit 24 and a RAM 21, a ROM 22, a durable memory medium 23 on which data may be written. The durable memory medium is a medium that retains data while supply of electricity to the navigation ECU 20 is stopped. For example, the durable memory medium 23 may be a non-volatile memory such as a hard disk, a flash memory, and a flash ROM, as well as a backup RAM.

The control unit 24 executes a program that is retrieved from the ROM 22 or the durable memory medium 23. At an execution time of such program, the control unit 24 retrieves information from and writes information to the RAM 21, the ROM 22, and the durable memory medium. The control unit 24 communicates with the HV control unit 10, the GPS receiver 11, the direction sensor 12, the vehicle speed sensor 13, the map DB memory unit 14, and the incline sensor 15. In addition, the control unit 24 performs a position identification process for identifying the vehicle position based on information acquired from the GPS receiver 11, the direction sensor 12, and the vehicle speed sensor 13.

Further, as shown in FIG. 2, the control unit 24 performs various processes, that is, a map matching process 25, a route calculation process 26, a navigation process 27, a target SOC monitoring process 28, and a driving process 29.

Based on the results of the position identification process, the control unit 24 performs the map matching process 25 to determine on which road the vehicle is currently running from among the roads in a map that is stored in the map DB memory unit 14.

In the route calculation process 26, the control unit 24 calculates a route to a destination based on the map data. The destination may be provided by a user of the vehicle by way of an operation unit, which is not shown.

In the navigation process 27, the control unit 24 displays a guidance on the screen of the display unit 17, or outputs guidance voice from a speaker (not illustrated), for assisting a travel of the vehicle along the calculated route to the destination.

In the target SOC monitoring process 28, the control unit 24 collects drive conditions to determine a SOC management plan for the travel of the vehicle, which is described in detail below. The collected drive conditions are stored in the durable memory medium 23.

In the driving process 29, when a target SOC is stored in the durable memory medium 23, the drive control of the engine 1 and the motor 3 is performed according to the target SOC stored in the durable memory medium 23. The driving process 23 is discussed further below.

When the vehicle travels on a road the control unit 24 performs a target SOC monitoring process 28 to monitor the current SOC of the battery 9. When the current SOC is "out-of-standard range", whether it is below a lower limit or above an upper limit, the control unit 24 defines a reference point at the location where the out-of-standard-range occurred. The control unit 24 then defines a candidate control section that includes the reference point and a predetermined distance before (i.e. "already-traveled" section) and after (i.e. "to-be-traveled" section) the reference point of the route traveled by the vehicle. Based on the drive conditions stored in the memory unit, the control unit 24 performs a SOC management plan process to construct a SOC management plan for the candidate control section. The SOC management plan maintains the current SOC of the battery 9 between the standard range while the vehicle is traveling along the candidate control section. The control unit 24 maintains the current SOC by performing the driving process 29 that controls the drive control of the power source according to the SOC management plan when the vehicle is determined to enter the candidate control section.

The above control processes provides that when the current SOC is beyond a standard range at a certain section of a frequently-traveled road due to various reasons, such as inclination of the road (i.e., a geographical cause), daily traffic congestion (i.e., a time-of-the-day cause), or the like, it is highly likely that the current SOC will go beyond the standard range in the same road section in the future.

A detailed explanation of the control processes performed by the control unit 24 is provided in the following. The control unit 24 first performs a drive condition storage process for periodically storing drive conditions of sections traveled by the vehicle. This ensures that the section traveled by the vehicle, which includes the reference point, is stored and available for the target SOC monitoring process 28.

Figure 3:
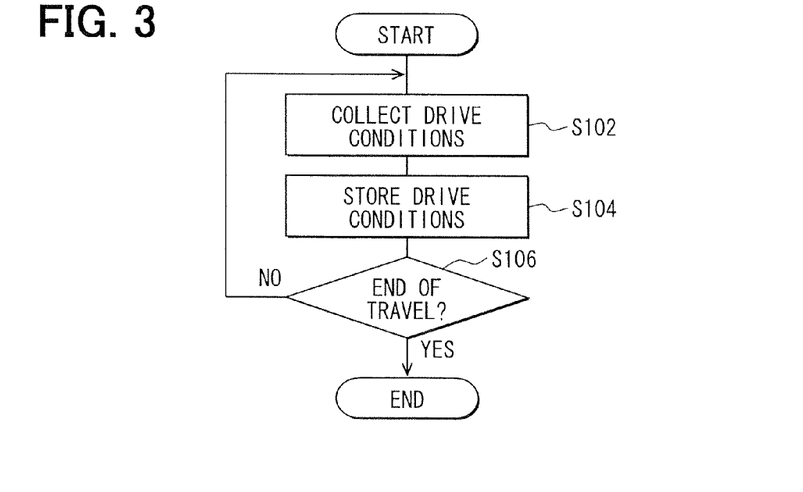
FIG. 3 is a flowchart of a drive conditions storage process.

FIG. 3 shows a flowchart of the drive conditions storage process. When the ignition switch of the vehicle is turned on, the vehicle drive control apparatus is put in an operation condition, and the control unit 24 periodically performs the process shown in FIG. 3. The process in S102 collects the drive conditions at a regular interval. For example, the drive condition may be collected every five meters. The interval may be changed to a value greater than or less than 5 meters. The following parameters are examples of drives conditions that may be collected by the control unit 24: a current SOC, a vehicle speed (km/h), a road incline (%), a driving electric power of the motor 3 (W), a re-generated electric power by the motor 3 (W), a travel time in the section (seconds), a consumed electric power (W) used by accessories such as an air-conditioner, a navigation apparatus, and the like.

The process in S104 stores the drive conditions in the durable memory medium 23. Such information is stored by identifying a road identifier of the road in which the vehicle is currently positioned. In the present embodiment, the drive conditions for the most recent 2 kilometers are memorized, and the drive conditions prior to the most recent 2 kilometers may be erased. It should be understood to one skilled in the art that the drive conditions for a section greater or less than 2 kilometers may also be stored in the durable memory medium.

The process in S106 determines whether the drive of the vehicle has finished traveling based on the off condition of the ignition switch of the vehicle. When the vehicle continues to run (S106:NO) the process continues to collect and memorize the drive conditions of the most recent traveled section. Once the vehicle is turned off (S106:YES) the process ends. Accordingly, the process continues to collect and store the drive condition of the most recent traveled road section till the vehicle is shut off.

Figure 4:
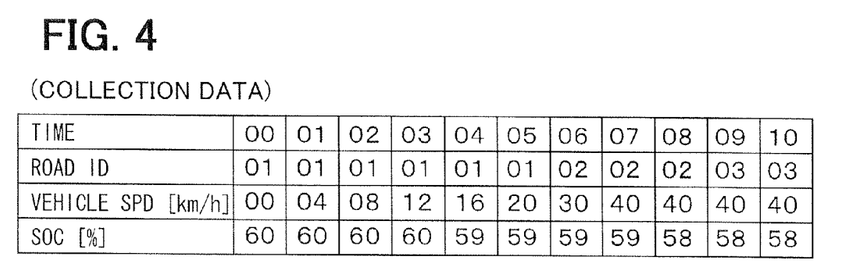
FIG. 4 is an illustration of drive conditions stored per the drive condition memory process of FIG. 3.

FIG. 4 shows an example of the drive conditions stored in the durable memory medium 23. The drive conditions are arranged by time, the road identifier, the vehicle speed, and the SOC. As described above, the drive conditions collected at a constant interval in association with the road identifier are memorized. In this case, the road identifier is the link ID or the segment ID for identifying a road section.

By performing the drive conditions storage process, the drive conditions of various types of roads are stored. For example, when the vehicle travels the expressway the drive conditions of the expressway are collected and stored in the durable memory medium 23. Also, when the vehicle travels a local road, the drive conditions of the local road are saved in the durable memory medium 23. In addition, when the vehicle travels from the expressway to the local road the drive conditions of a travel bridging from the expressway to the local road are stored in the durable memory medium 23.

Figure 5:
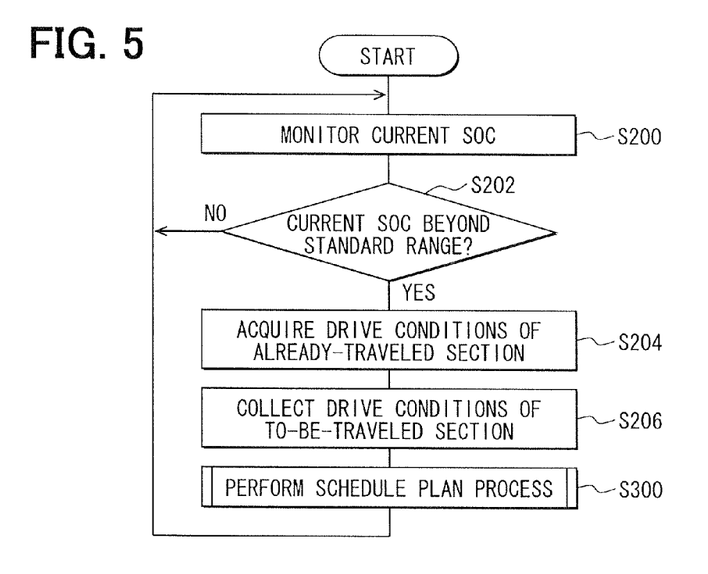
FIG. 5 is a flowchart of a target SOC monitoring process.
Figure 6:
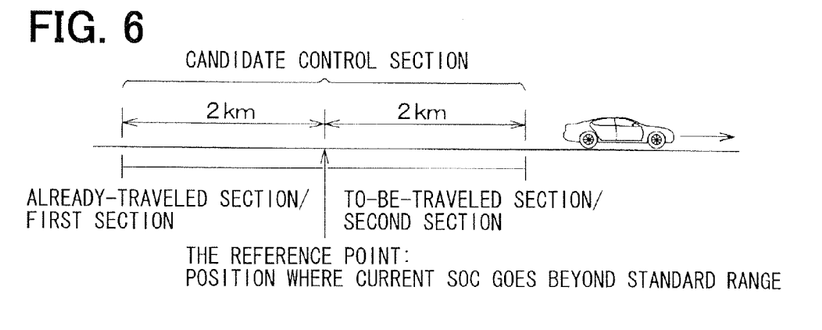
FIG. 6 is an illustration of a candidate control section.

With reference now to FIGS. 5 and 6, the target SOC monitoring process 28 will be described. When the ignition switch of the vehicle is put in an on condition, the control unit 24 performs the target SOC monitoring process 28 shown in FIG. 5, in parallel with the process shown in FIG. 3.

The process in S200 monitors the current SOC. A signal representing the current SOC of the battery 9 is provided to the navigation ECU 20. The current SOC is monitored based on the signal indicative of the remaining amount of charge in the battery 9.

Next, the process in S202 determines whether the current SOC is beyond a standard range. In the present embodiment, the standard range of the current SOC is determined as a range between a lower limit standard value (e.g., equal to or smaller than 40%) and an upper limit standard value (e.g., equal to or greater than 70%).

When the current SOC is within the standard range (S202: NO), the process returns to S200 to monitor the current SOC. When the current SOC is beyond the standard range (S202: YES), the process, in S204, acquires the drive conditions for the most recent section traveled by the vehicle from the durable memory medium 23. The point where the current SOC is detected outside the standard range is referred to as the reference point. The process retrieves the drive conditions of a first section traveled by the vehicle, which includes the reference point, for a predetermined distance before the reference point (as shown in FIG. 6).

The process, in S206, also collects the drive conditions for a second section of travel that includes the reference point for a predetermined distance (e.g., 2 kilometers) after the reference point, while the vehicle travels such section (as shown in FIG. 6). Therefore, when the current SOC is detected outside the standard range, the drive conditions are collected for a candidate control section that consists of the first section and the second section (as shown in FIG. 6). In the present embodiment the predetermined distance is defined as two kilometers, but is should be understood to one skilled in the arts that the distance may be a value smaller or greater than two kilometers.

Using the driving condition information of the first and second section of travel by the vehicle, the control unit 24 performs a SOC management plan process for the candidate control section.

Figure 7:
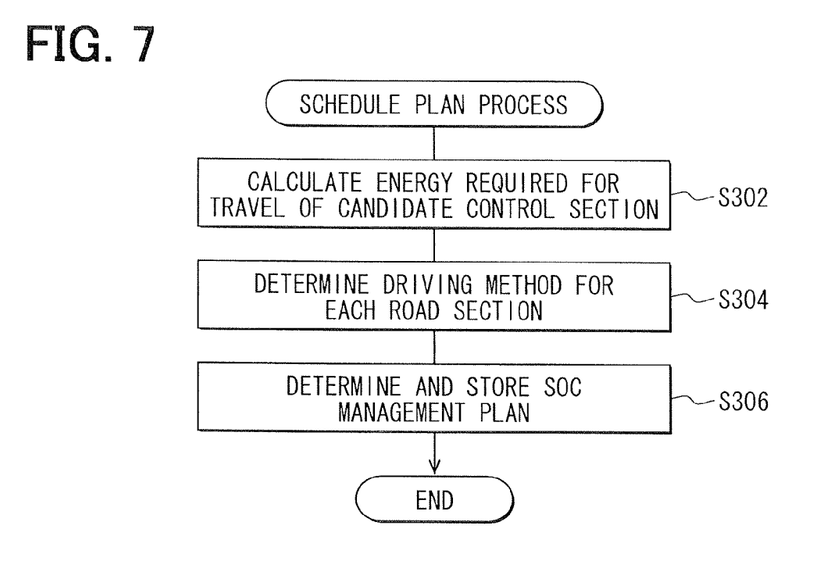
FIG. 7 is a flowchart of a schedule plan process.
Figure 8:
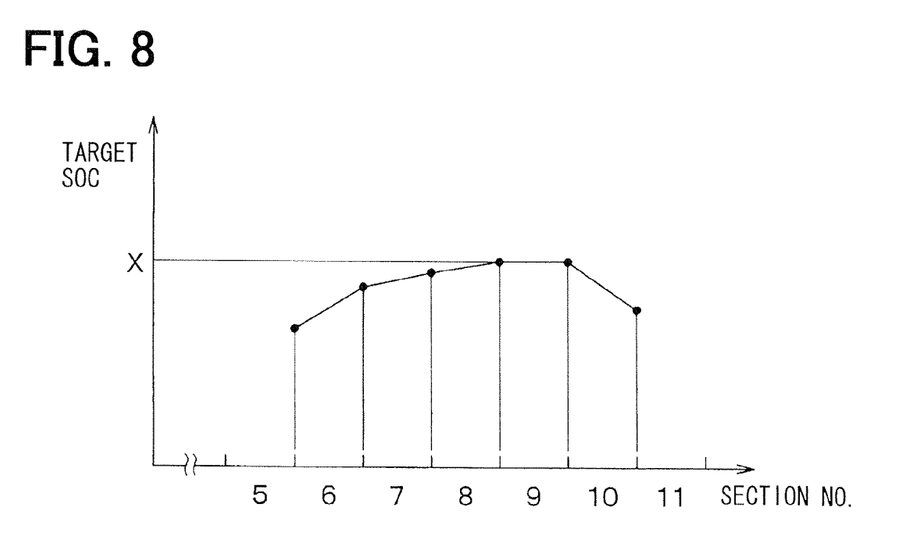
FIG. 8 is an illustration of an estimated transition of a target SOC.

With reference now including FIGS. 7 and 8 the schedule plan process will be described. Based on the drive conditions memorized in the durable memory medium 23, the process, in S302, calculates the energy required for the vehicle to travel along the candidate control section.

The process, in S304, determines the driving method for each road section. Specifically, after acquiring the standard SOC from the HV control unit 10, a control method is selectively determined for the candidate control section. Based on the standard SOC and the drive conditions the SOC management plan process determines the control method, which includes calculating an electricity generation efficiency and an assist efficiency; determines the running mode of the vehicle; and whether to perform the internal combustion charge, and/or the re-generation charge.

Based on the drive conditions, the process, in S306, creates an SOC management plan for the candidate control section and stores the SOC management plan in the durable memory medium 23. The SOC management plan controls the current SOC to stay within the standard range. The SOC management plan is an estimated transition of the target SOC for the candidate control section. FIG. 8 shows an example of the estimated transition of the target SOC. In the present embodiment, the SOC management plan defining the target SOC that improves the fuel efficiency is generated in association with the road identifier in the candidate control section. Because the method of generating such SOC management plan is well-known, the details of such method is omitted from this specification. Please refer to the specification of JP-A-2001-183150, which references pages 123 to 124 of "Development of a new energy vehicle" published from CMC publication.

Figure 9:
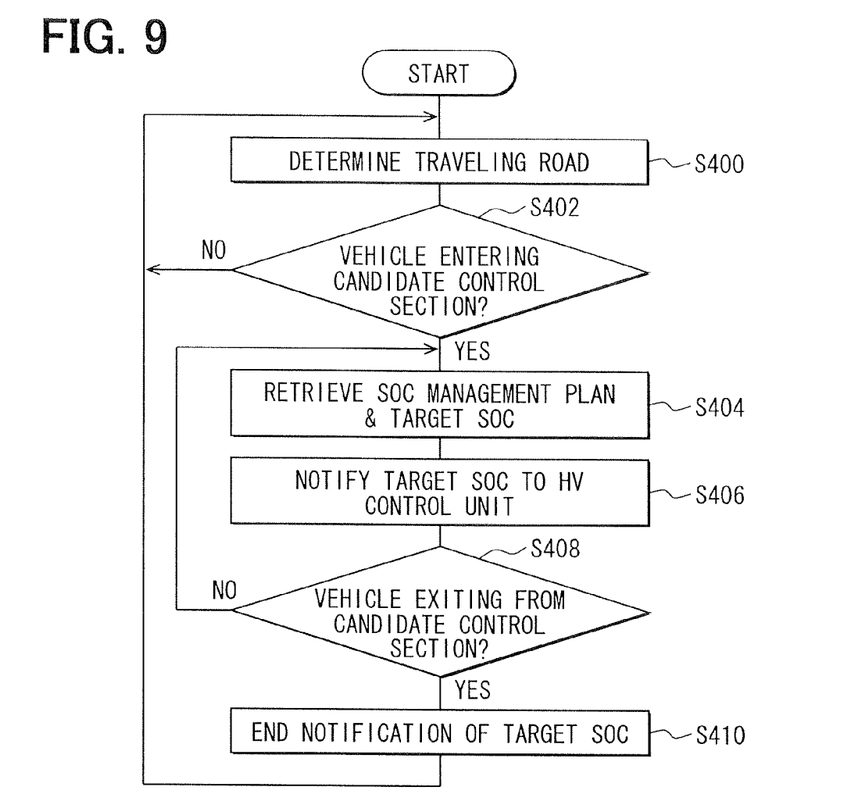
FIG. 9 is a flowchart of a driving process.

With reference now including FIGS. 9 and 10 the driving process 29 will be described. When the ignition switch of the vehicle is turned to the on condition, the control unit 24 performs the driving process 29 in parallel with the drive conditions storage process, the target SOC monitoring process 28, and the SOC management plan process.

When the ignition switch of the vehicle is turned to the "on" condition, the process, in S400, determines where the vehicle is traveling. Based on the map matching process 25, the road on which the vehicle is traveling can be determined.

The process, in S402, determines whether the vehicle has entered a candidate control section. When the road the vehicle is traveling on is stored in the durable memory medium 23 as a candidate control section, the process can determine when the vehicle has entered into the candidate control section.

When the vehicle has not entered a candidate control section (S402:NO), the process returns to S400 till it is determined that the vehicle has entered a candidate control section. In such a situation, the HV control unit 10 autonomously performs the drive control according to the vehicle speed, the degree of opening of the accelerator, and the like.

When the subject vehicle enters the candidate control section (S402:YES), the process retrieves the SOC management plan to retrieve the target SOC. With reference to the SOC management plan determined for the candidate control section, the target SOC for the current position of the vehicle is retrieved.

The process, in S406, notifies the HV control unit 10 of the target SOC for the current position of the vehicle, which is retrieved from the durable memory medium 23. In such manner, the HV control unit 10 performs the drive control so that the current SOC of the battery 9 is brought closer to the target SOC.

The process, in S408, determines whether the vehicle has exited from the candidate control section. Exit from the candidate control section is determined on whether the road the vehicle is traveling on is saved in the durable memory medium 23 as a candidate control section.

When the vehicle is traveling in the candidate control section (S408:NO) the process returns to S404 till the vehicle travels outside the candidate control section. Therefore, the drive control is performed according to the target SOC for the candidate control section.

When the vehicle moves out of the candidate control section (S408:YES), the drive control is no longer performed per the target SOC. The process, in S408, stops transmitting the target SOC to the HV control unit, and the process returns to S400, where the drive process 29 is repeated. Accordingly, the HV control unit 10 autonomously performs the drive control according to the vehicle speed, the degree of opening of the accelerator, and the like.

Figure 10:
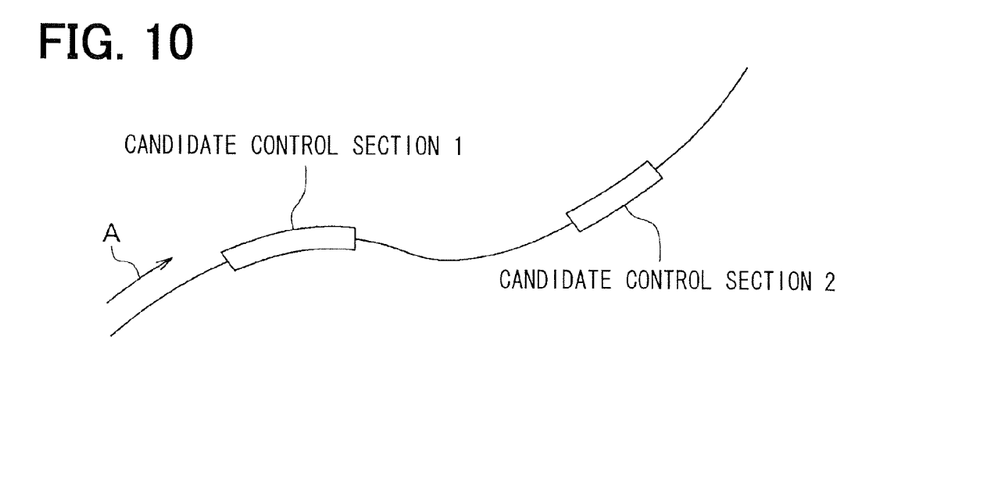
FIG. 10 is an illustration of the driving process of FIG. 9.

As shown in the illustration of FIG. 10, a vehicle "A" is traveling along a route. The drive control process 29 detects when the vehicle "A" enters the candidate control section 1. Once the vehicle "A" enters the candidate control section 1, the drive control process 29 transmits the target SOC defined in the SOC management plan for the candidate control section 1. Once the vehicle "A" exits the candidate control section 1, the drive control process 29 stops transmitting the target SOC. As the vehicle "A" continues its travel, it enters a candidate control section 2. The drive control process 29 then transmits the target SOC defined in the SOC management plan for the candidate control section 2. Once the vehicle "A" exits the candidate control section 2, the notification of the target SOC to the HV control unit 10 is stopped. The HV control unit 10 autonomously performs the drive control according to the vehicle speed, the degree of opening of the accelerator, and the like. The drive control process 29, continues to monitor the travel of the vehicle to determine when the vehicle enters a candidate control section.

Based on the above described configuration of the vehicle drive control apparatus, when the current SOC of the battery 9 is detected outside the limits of the standard range, the position of the vehicle is set as the reference point. An "already-traveled" section before and including the reference point (i.e. a first section) and a "to-be-traveled" section after and including the reference point (i.e. a second section) are combined to define the candidate control section. Based on the memorized drive conditions in the durable memory medium 23, a SOC management plan is created for the candidate control section, so that the current SOC of the battery 9 is controlled to stay within the standard range. Upon detecting the entrance of the subject vehicle into the candidate control section, the SOC management plan for that candidate control section is used to perform the drive control of the vehicle. Therefore, the reduction of the energy consumption can be planned without requiring the user of the vehicle to enter information to determine a route.

Drive conditions for the recently traveled predetermined distance are collected during the travel of the vehicle for the predetermined road sections, and the collected drive conditions are stored in the durable memory medium 23. When the current SOC reaches the upper limit or the lower limit of the standard range, such position designated as the reference point is used to define a section before the reference point for collecting the drive conditions of predetermined sections during the travel of the vehicle and for accumulatively memorizing such drive conditions in the durable memory medium 23. Therefore, all of the drive conditions collected during the travel of the vehicle are not required to be cumulatively memorized in the durable memory medium 23, thereby enabling a reduction of memory areas in the durable memory medium 23 required for memorizing such drive conditions.

Although the present disclosure has been fully described in connection with preferred embodiment thereof with reference to the accompanying drawings, it is to be noted that various changes and modifications will become apparent to those skilled in the art.

For example, in the above embodiment, a hybrid vehicle using an engine and a motor as its driving power source is shown as an example of the vehicle to have the vehicle drive control apparatus applied thereto, the vehicle drive control apparatus may also be applicable to a plug-in hybrid vehicle that can be charged by the electricity from a power outlet of the household, for example.

In addition, though, in the above embodiment, the candidate control section is defined and the SOC management plan is determined for such section even when the remaining battery amount goes beyond the standard range at least once, determination of the SOC management plan may only be performed for sections that are memorized as the candidate control section in the durable memory medium 23 for more than predetermined times. According to such control scheme, the vehicle drive control apparatus may perform the target SOC monitoring process and the SOC management plan process for the candidate control section that is memorized as the candidate control section in the durable memory medium 23 multiple times (i.e. a predetermined number of times). That is, the target SOC monitoring process and the SOC management plan process may only be performed for the frequently memorized road sections in the durable memory medium 23.

The embodiments and claim language may be associated in the following manner. That is, the durable memory medium 23 corresponds to memory unit, and S100-S104 correspond to a drive condition accumulation unit, and S200-S206 corresponds to a charge control section determination unit, and S302-S306 correspond to a schedule plan unit.

Such changes, modifications, and summarized scheme are to be understood as being within the scope of the present disclosure as defined by appended claims.

What is claimed is:

1. A vehicle drive control apparatus disposed in a vehicle that uses an internal-combustion engine and a motor as a driving power source, the apparatus for performing drive control of the power source according to a state of charge (SOC) management plan, the apparatus comprising:
a drive condition accumulation unit that collects drive conditions when the vehicle travels in each of predetermined sections and cumulatively stores the drive conditions in a memory unit, wherein the drive condition determine the SOC management plan;
a charge control section determination unit that determines a candidate control section at a reference point, at which the candidate control section is made up from a first and a second sections, the first section being a predetermined travel distance including and before the reference point, the second section being a predetermined travel distance including and after the reference point,
wherein, during a travel of the vehicle, the charge control section determination unit designates, as the reference point, the location of when a remaining charge amount of a battery exceeds a predetermined upper limit standard value more than once or falls below a predetermined lower limit standard value more than once; and
a schedule plan unit that determines the SOC management plan for the candidate control section by using the drive conditions stored in the memory unit, wherein the SOC management plan controls the remaining charge amount of the battery to stay within a standard range of charge amount throughout the candidate control section, when the vehicle travels along the candidate control section,
wherein when the vehicle is determined to enter the candidate control section, the drive control of the power source is performed according to the SOC management plan created for the candidate control section into which the vehicle has entered.

2. The vehicle drive control apparatus of claim 1, wherein the schedule plan unit determines the SOC management plan for the candidate control section that has been stored in the memory unit at a number of times being equal to or greater than a threshold.

3. The vehicle drive control apparatus of claim 1, wherein the drive condition accumulation unit collects the drive conditions of a latest travel of the vehicle for a predetermined travel distance during the travel of the vehicle to cumulatively memorize the drive conditions in the memory unit for each of the predetermined sections, and
wherein when the remaining charge amount of the battery is determined to be equal to either of the predetermine upper limit or the lower limit standard value, the drive condition accumulation unit collects, for each of the predetermined sections, the drive conditions of the to-be-traveled section including the reference point during the travel of the vehicle to cumulatively memorize the collected drive conditions in the memory unit.

4. The vehicle drive control apparatus of claim 1, wherein the charge control section determination unit determines a plurality of candidate control sections, including the candidate control section,
the schedule plan unit determines, for each of the candidate control sections, one of a plurality of SOC management plans that will control the remaining charge amount of the battery to stay within the standard range throughout the each of the candidate control sections.

5. The vehicle control apparatus of claim 1, wherein the candidate control sections are spaced apart from each other on a route that the vehicle travels.

6. The vehicle control apparatus of claim 1, further comprising
a hybrid control unit that performs drive control of the power source,
without reference to the SOC management plan, when the vehicle is not traveling in the candidate control section, and
according to the SOC management plan, when the vehicle travels in the candidate control sections.

7. The vehicle control apparatus of claim 1, wherein the standard range of the charge amount is a range between the predetermined lower limit standard value and the predetermined upper limit standard value, the predetermined lower limit standard value is equal to or smaller than 40%, and the predetermined upper limit standard value is equal to or greater than 70%.

* * * * *